Figure 8:
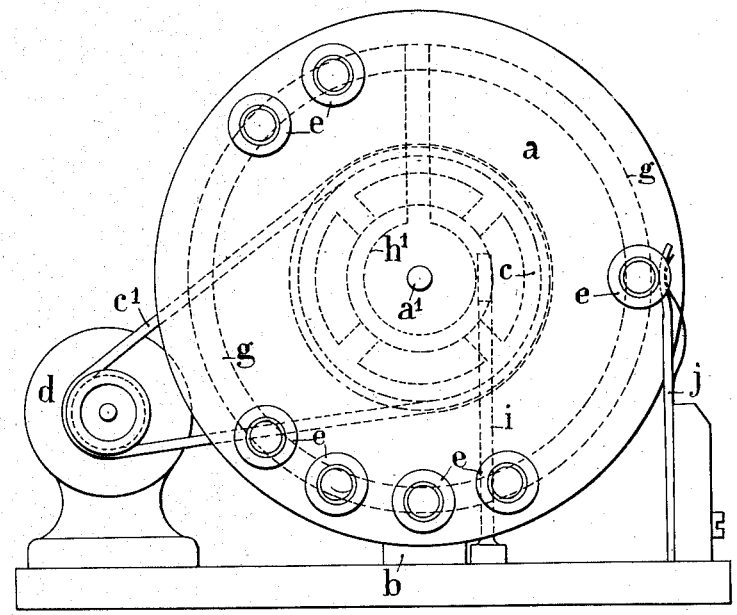

C. F. DUSSAUD.
LIGHTING SYSTEM.
APPLICATION FILED APR. 3, 1912.
1,174,240.
Patented Mar. 7, 1916.
7 SHEETS—SHEET 1.
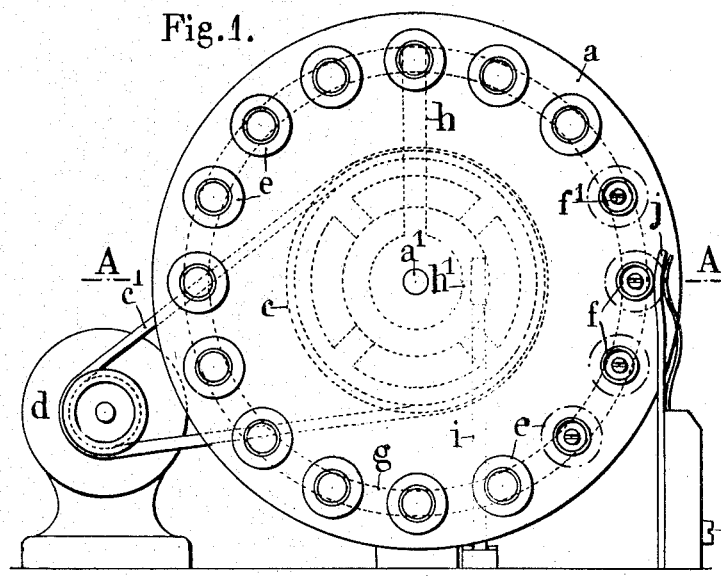
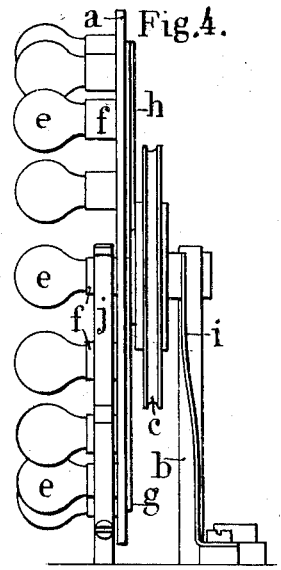
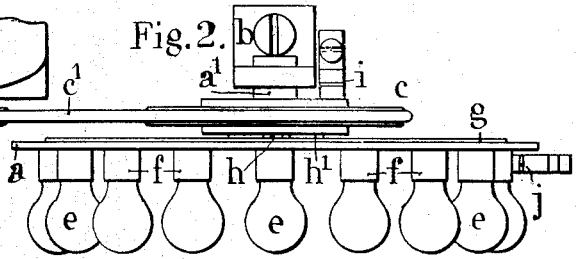
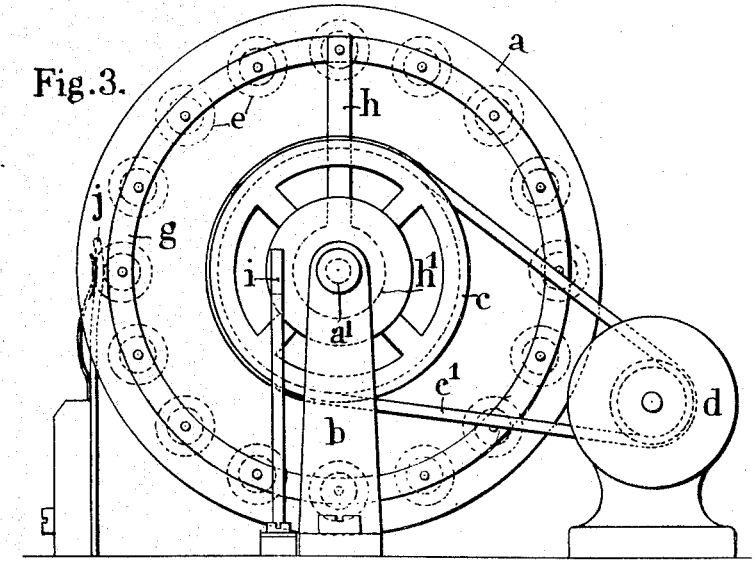
Witnesses:
Inventor:
Charles François Dussaud
per
Lawrence Langner
Attorney.

C. F. DUSSAUD.
LIGHTING SYSTEM.
APPLICATION FILED APR. 3, 1912.
1,174,240.
Patented Mar. 7, 1916.
7 SHEETS—SHEET 2.
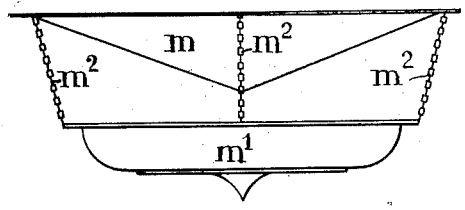
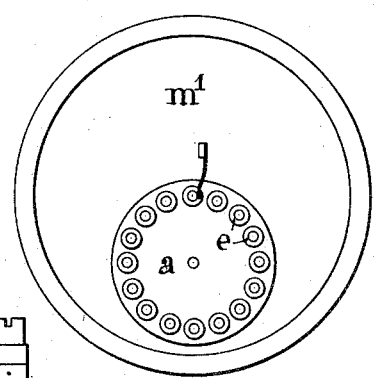
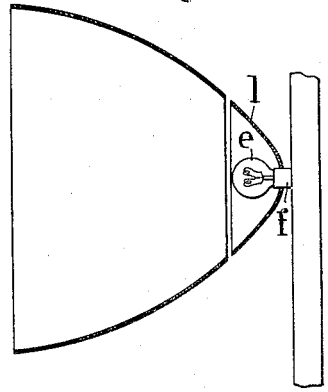
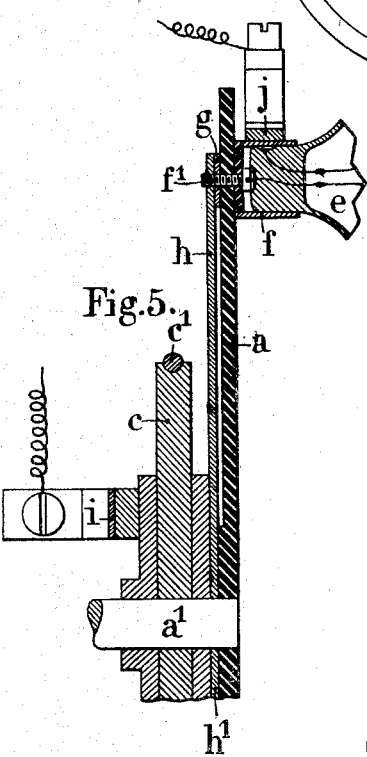
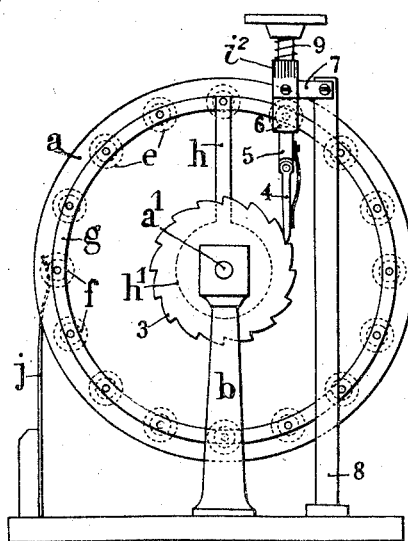
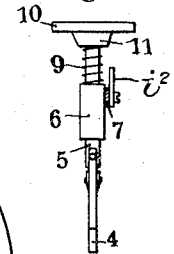

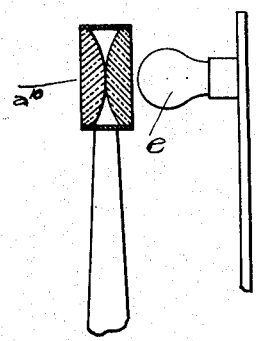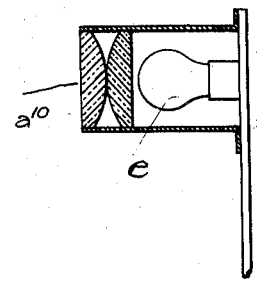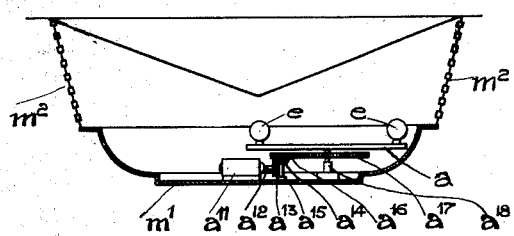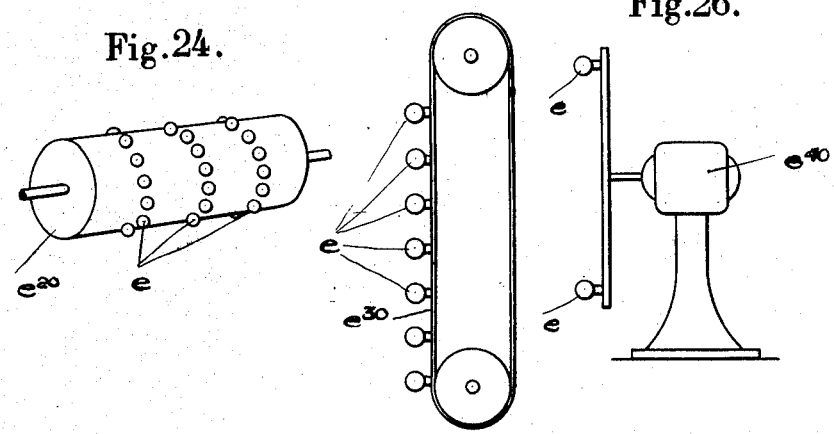

C. F. DUSSAUD.
LIGHTING SYSTEM.
APPLICATION FILED APR. 3, 1912.

1,174,240.

Patented Mar. 7, 1916.
7 SHEETS—SHEET 4.

C. F. DUSSAUD.
LIGHTING SYSTEM.
APPLICATION FILED APR. 3, 1912.

1,174,240.

Patented Mar. 7, 1916.
7 SHEETS—SHEET 5.

Witnesses:

Inventor:
Charles François Dussaud
per
Lawrence Langner
Attorney.

C. F. DUSSAUD.
LIGHTING SYSTEM.
APPLICATION FILED APR. 3, 1912.
1,174,240.
Patented Mar. 7, 1916.
7 SHEETS—SHEET 6.
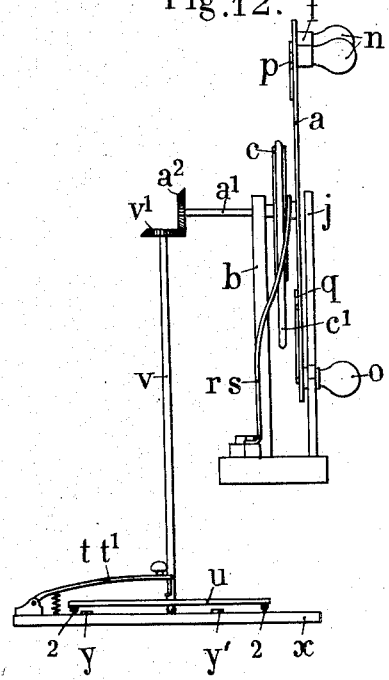
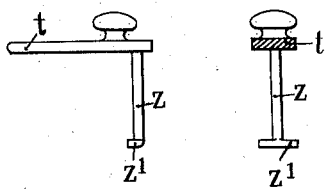
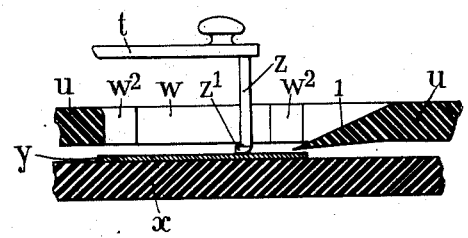
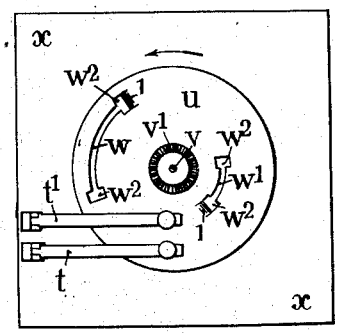
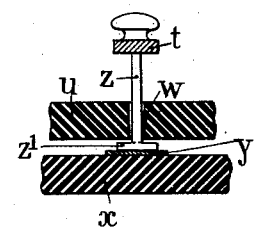
Witnesses:
Inventor:
Charles François Dussaud
per
Lawrence Languier
Attorney.

C. F. DUSSAUD.
LIGHTING SYSTEM.
APPLICATION FILED APR. 3, 1912.

1,174,240.

Patented Mar. 7, 1916.
7 SHEETS—SHEET 7.

Witnesses:

Inventor:
Charles François Dussaud
per
Lawrence Langner
Attorney.

UNITED STATES PATENT OFFICE.

CHARLES FRANÇOIS DUSSAUD, OF PARIS, FRANCE, ASSIGNOR TO SOCIÉTÉ INTERNATIONALE DE LUMIÈRE FROIDE (PROCÉDÉS DUSSAUD), OF PARIS, FRANCE.

LIGHTING SYSTEM.

1,174,240.   Specification of Letters Patent.   Patented Mar. 7, 1916.

Application filed April 3, 1912. Serial No. 688,294.

*To all whom it may concern:*

Be it known that I, CHARLES FRANÇOIS DUSSAUD, of 19 Rue Guillaume Tell, in the city of Paris, Republic of France, have invented a Lighting System, of which the following is a full, clear, and exact description.

This invention has for its object a lighting system capable of giving a light of very great intensity without this light producing any appreciable heat.

This lighting system substantially comprises: $a$, a series of electric lamps with metallic filament (preferably of tungsten) mounted upon a disk, drum or endless band receiving a continuous or intermittent rotary motion and all connected to one of the poles of a source of electric energy; $b$, a fixed contact, connected to the other pole of the source of electric energy and arranged in such a manner that the lamps, during their rotary motion, successively come into contact with the same, these lamps thus lighting up successively at one and the same point; the number of these lamps must be sufficiently large for allowing the metallic filament of each lamp to cool between two successive lightings.

For the purpose of increasing the luminous power of the lighting system, the lamps are supervolted at the lighting point and are provided with reflective mirrors, or light opposite a condenser, or are each provided with a portion of a reflector coming opposite a fixed reflector open at its base and arranged opposite the lighting points of the lamps.

It is well known that there has been used, for lighting, electric lamps placed one behind the other and lighting successively, but these devices were combined especially for producing animated luminous effects and not for obtaining a fixed intense light without appreciable heat.

This lighting system is capable of being used with advantage for projecting purposes, as, even if it is provided with a condenser, the heat it gives off being practically nil, it is incapable of igniting easily inflammable bodies, such as celluloid. By reason of the low temperature of the electric bulbs at the time of their lighting, the latter may be very close to the condenser, which allows of obtaining a better utilization of the light rays.

This lighting system may also be applied for the constitution of flare-up lights or lighthouses and for constituting apparatus for optical telegraphy.

The accompanying drawings illustrate by way of example various apparatus for carrying out the present invention.

Figures 9, 10:
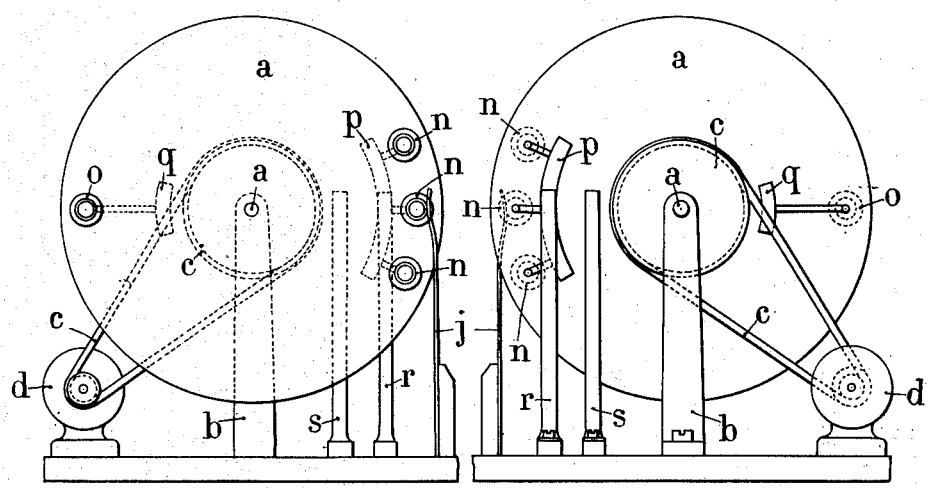
Figure 11:
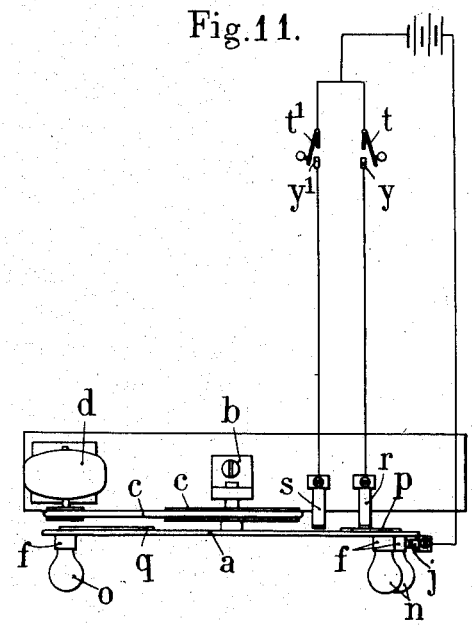
Figure 20:
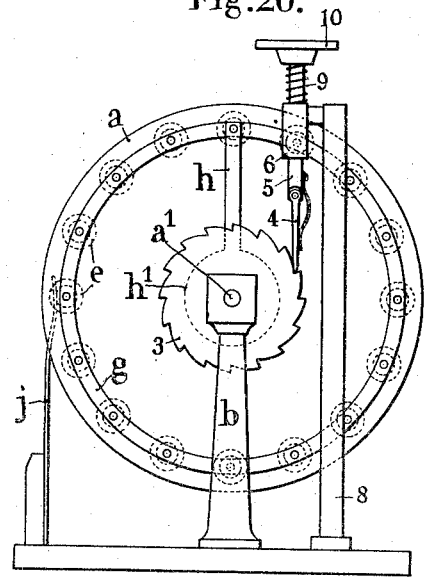
Figure 22:
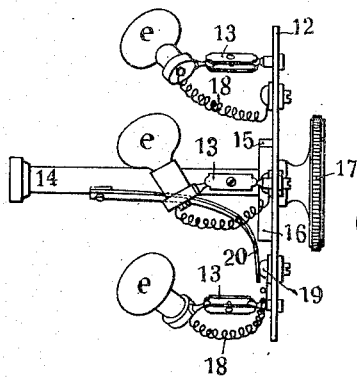
Figure 23:
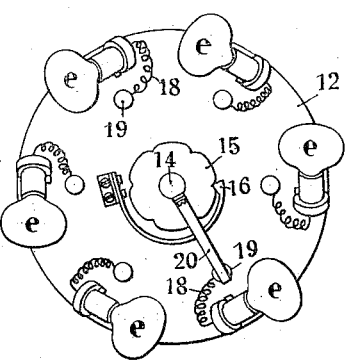

Figure 1 shows in elevation a continuous movement apparatus; Fig. 2 is a corresponding plan view; Fig. 3 is a back view thereof; Fig. 4 is a side view of the same apparatus; Fig. 5 is a horizontal section on line A—A of Fig. 1; Figs. $5^a$ and $5^b$ show a condenser arranged in two different ways; Fig. 6 is an elevation, Fig. $6^a$ a sectional view and Fig. 7 a plan view of the apparatus applied to a lighting apparatus to be fitted to a ceiling; Fig. 8 is an elevation of an apparatus arranged for constituting a flare-up light or lighthouse; Fig. 9 is an elevation of an apparatus for optical telegraphy; Fig. 10 is a back view thereof; Fig. 11 is a plan view of same; Fig. 12 shows the apparatus provided with a control device; Fig. 13 is a plan view of this control device; Fig. 14 is a side view and Fig. 15 a front view of the key of one of the manipulators; Fig. 16 shows the key of the manipulator engaged in a perforation of the control device; Fig. 17 is a front view thereof; Fig. 18 shows an intermittent movement apparatus; Fig. 19 is a detail view; Fig. 20 is a modification of this latter apparatus; Fig. 21 is a special reflector; Fig. 22 shows in elevation a device for bringing the lamps successively opposite a determined point of the space; Fig. 23 is a front view thereof; Fig. 24 shows electric lamps mounted on the periphery of a rotating drum; Fig. 25 shows the same lamps mounted on an endless band; Fig. 26 shows the lamps mounted on a carrier directly secured on the shaft of a small dynamo.

As illustrated in the drawings (Figs. 1 to 5), the continuous movement apparatus comprises a disk $a$, made of insulating material, vertically arranged and mounted upon an axis $a^1$ capable of rotating in a support $b$. Upon this axis $a^1$ which is electrically insulated, is also secured a metal pulley $c$ connected by a cable $c^1$ to a small driving motor $d$.

On the front face of the disk $a$ are arranged electric bulbs $e$ with metallic filament, preferably of tungsten. These bulbs, which are equidistant, form a continuous crown and are each mounted in a socket $f$ secured upon the disk $a$ by means of a screw $f^1$ electrically insulated from this socket. The two poles of the lamp are respectively in communication with the socket $f$ and the screw $f^1$, as illustrated in Fig. 5. The electric current is brought to the electric bulbs $e$ thus arranged in the following manner: The end of each of the screws $f^1$ serving to secure the sockets $f$ is fitted in a metallic crown $g$ arranged upon the back part of the disk $a$. This metallic crown $g$ is connected by a plate $h$ to a metal disk $h^1$ fitted against the metal pulley $c$. Upon the latter constantly rubs a brush $i$ connected to one of the poles of the source of electric energy. The other pole of this source is connected to a brush $j$ placed at a point of the circumference described by the sockets $f$ during the rotary motion of the disk $a$; this brush is successively encountered by the lamp sockets $f$.

By reason of the arrangement of the electric bulbs $e$, a pole only of which is constantly connected to the source of electric energy, each of these bulbs is lighted only at the moment its socket $f$ comes into contact with the brush $j$ and this lamp extinguishes as soon as its socket $f$ leaves the said brush $j$. The working of the apparatus will then be easily understood.

The disk $a$ carrying the bulbs $e$, receiving from the motor a rotary motion, all the bulbs light successively at one and the same point, at the moment they come into contact with the end of the brush $j$, and extinguish as soon as they leave the same.

By reason of the use of lamps provided with metallic filament, which practically light instantaneously, it is possible, by causing the disk $a$ to rotate at a sufficient speed, to obtain a lighting which, in consequence of the persistence of the impressions upon the retina, seems to come from a single permanent source. On the other hand, by arranging a sufficient number of electric bulbs upon the disk $a$, the filament of each lamp will have time to cool between two successive lightings, so there will not be produced any heating, since there will not be any addition of heat and that the light thus obtained at a point of the space will be practically cold.

Preferably, the electric bulbs $e$ will be supervolted to such an extent that the metallic filament may resist without deterioration during the very short time of the lighting. There is thus obtained a much more intense light which may still be increased by placing behind each lamp a mirror or a reflector of suitable shape. Each lamp may also be provided with a reflector portion $l$ as shown in Fig. 21, coming opposite a fixed reflector $l^1$ at the precise moment the lamp lights. This fixed reflector $l^1$ is cut away at its base and it is arranged in such a manner as to form the continuation of the reflector portion $l$, so that the light is reflected by the two portions $l$ and $l^1$ of the reflector. The apparatus may also be combined with a condenser $a^{10}$ so as to obtain a great luminous power. In this case (see Fig. 5$^a$), each of the electric bulbs $e$ lights opposite this condenser which may be arranged very near the lamps, without any danger of heating and which, consequently, may have a very short focus, thus still increasing the luminous power of the bulb.

Instead of using a single condenser, opposite which the electric lamps $e$ light successively, the condenser $a^{10}$ may be secured in front of each bulb (see Fig. 5$^b$), thus avoiding any luminous losses due to the passage of the electric bulb from one edge of the fixed condenser to the other, by reason of the putting in movement of this bulb by the disk $a$.

The apparatus described can receive numerous applications. By using lamps without supervoltage, there is obtained a light such that the glass is at the ambient temperature, which allows, for instance, to make scientific studies upon bodies, living or not, very delicate to heat and, in any case, where the heat produces any perturbation whatever upon the lighted bodies. When the lamps are supervolted, the light obtained is, in practice, cold and incapable of igniting easily inflammable bodies, such, for instance, as celluloid, of producing burns, or of creating any danger whatever. This apparatus is therefore quite appropriate to the lighting of fixed or moving pictures. It may also be used for the lighting of rooms or halls, for instance, in combination with a lighting apparatus to be fitted to the ceiling and giving a diffuse light. This application is illustrated in Figs. 6 and 7 of the drawings. In this case, the apparatus to be fitted to the ceiling comprises, as usual, a conical reflector $m$ placed against the ceiling. Under this reflector is arranged a circular vessel $m^1$ held by small chains $m^2$ or any other means. This vessel, which may have any suitable shape and may be ornamented in any manner whatever, serves as a support for the lighting apparatus the disk $a$ of which is arranged horizontally with the bulbs $e$ extending upwardly. This apparatus is arranged in such a manner that the various bulbs $e$ light successively at a point located exactly at the center of the vessel $m^1$; as illustrated in Fig. 7. By reason of the speed of rotation of the disk $a$ there is obtained a light which seems to come from a single permanent source; this light, in consequence of the lighting point of the bulbs, will be reflected by the entire surface of the reflector $m$. The means for rotating the disk $a$ comprises, as shown in Fig. 6$^a$, a small spring or electric motor $a^{11}$, for example, mounted on the base of the vessel $m^1$. The spindle $a^{12}$ of this motor carries a bevel wheel $a^{13}$ which meshes with a bevel wheel $a^{14}$ mounted on a vertical spindle $a^{15}$. This latter spindle also carries a pinion $a^{16}$ which is adapted to engage with a gear wheel $a^{17}$ mounted on a vertical spindle $a^{18}$ secured to the disk $a$: the operation of this driving means and gearing will be obvious.

The apparatus, arranged as mentioned above, may also serve, with or without an optical system, for emergency lightings, either in public places or in the open air and in every case where the want of room, the weight, the want of transportability prevent the use of the actual apparatus giving a powerful electric lighting.

The continuous movement apparatus may also be used for constituting intermittent lights the number and the duration of the flashes of which may be varied at will. In this case, the lamps $e$, instead of forming a crown on the disks $a$, are arranged at determined points as illustrated in Fig. 8. It will be easily understood that by varying the position and the number of the lamps $e$ on the disk $a$, intermittent lights will be obtained the flashes of which may also vary and may be different for various light sending stations.

It is to be understood that an optical system may be placed opposite the lighting point of the lamps. By using an apparatus of this kind flare-up lighthouses of a great luminous intensity can be constructed at a low net cost. This apparatus can also be used with advantage as a source of light for hinterland guide or marking lights in connection with aerial navigation.

This continuous movement apparatus may serve also, with some modifications, for establishing apparatus for optical telegraphy and allowing the sending of luminous signals, according to a determined code, for instance the Morse alphabet in which the letters are formed by long or short electric impulses, variously combined. Figs. 9 to 17 illustrate one of these apparatus. In this arrangement, the disk $a$ carries, upon its front face, two series of electric lamps arranged according to a single concentric circle. The first series $n$ comprises a number of lamps arranged side by side and adapted to produce luminous emissions of a certain length corresponding to the dashes of the Morse alphabet. The second series $o$ comprises one or several lamps adapted to produce short luminous emissions corresponding to the dots of the Morse alphabet. In the accompanying drawing the series $o$ comprises a single lamp. The lamp sockets $f$ of the series $n$ are connected to a contact $p$ and those of the series $o$ to a contact $q$ both secured on the back face of the disk $a$.

These contacts $p$ and $q$ are placed at different points of two concentric circles and their sizes correspond to the number of lamps of the two series $n$ and $o$. The lamps of these two series are fed by a separate circuit. To that effect, two brushes $r$ and $s$ can come in engagement with the contacts $p$ and $q$; these brushes are connected through the medium of two manipulators $t$ and $t^1$ with one of the poles of the source of electric energy. The other pole of this source is connected to the brush $j$ which can come in contact with the lamp sockets $f$. The manipulators $t$ and $t^1$ allow the current to pass either for feeding the lamps of the series $n$ corresponding to the long emissions, or for feeding the lamp $o$ corresponding to the short emissions.

The operation of this apparatus is effected as follows: If, for instance, the operator presses upon the manipulator $t$ for obtaining a long emission the circuit is closed and the current arrives in the brushes $r$ and $j$. The contact $p$ being driven along by the disk $a$ is encountered by the brush $r$ and the socket $f$ of the first lamp of the series $n$ by the brush $j$. This lamp lights during a very short time and then extinguishes when the socket leaves the brush $j$. The socket of the second lamp then comes in contact with the same brush, lights up in its turn and extinguishes soon after and so on for all the lamps of the series. When the brush $j$ has been left by the socket of the last lamp, the brush $r$ leaves the contact $p$. As mentioned above, by reason of the persistence of the impressions upon the retina the lighting will seem constant during the entire duration of the passage of the lamps of the series opposite the brushes. For obtaining short emissions the operator acts upon the manipulator $t^1$ so as to send the current in the brushes $s$ and $j$. When the brush $s$ encounters the contact $q$ and the brush $j$ the socket of the lamp $o$, the latter lights up during a very short time. Any optical device whatever may be arranged opposite the lighting point of the lamps.

In order that the operator may press down the manipulators $t$ and $t^1$ only at the time the lamps are in the lighting position, and only during the time this lighting is to last, the apparatus is completed by a control device illustrated in Figs. 12 and 13. This device comprises a disk $u$ rotating synchronously with the disk $a$. For instance, this disk may be mounted upon a vertical axis $v$ carrying at its end a conical pinion $v^1$ gearing with another pinion $a^2$ fast upon the shaft $a$. The disk $u$ is provided with two perforations $w$ and $w^1$ located on the two concentric circles. These perforations are formed at such points that they are presented in front of the manipulators at the time the lamps arrive at their lighting position. The manipulators $t$ and $t^1$ are mounted upon a fixed plate $x$ made of insulating material and placed under the disk $u$ at a small distance from the latter. This plate supports, opposite the manipulators and at points corresponding to the circumference described by each perforation $w$ and $w^1$, two contacts $y$ and $y^1$ connected to the brushes $r$ and $s$, while the two manipulators are connected to one of the poles of the battery as explained above.

Each manipulator is provided with a key $z$ which can enter the perforation $w$ or $w^1$ for coming in engagement with the corresponding contact. In order that this key may be engaged into the perforation only at the precise moment the latter arrives opposite the said key, and for preventing the raising of the manipulator during the time the lighting of the lamps is to last, each key $z$ is provided at its ends with a patten $z^1$ arranged transversely relatively to the said key. On the other hand, each perforation $w$ or $w^1$ comprises at each of its ends an enlarged part $w^2$ of sufficient size for allowing the free passage of the patten, these two enlarged parts being connected by a slot the width of which is smaller than that of the patten, but sufficient for allowing the passage of the stem of the key $z$, as illustrated in Fig. 17. The enlarged part placed at the end of the perforation presents an incline 1 provided in the thickness of the disk $u$. When, for instance, the operator presses upon the manipulator $t$ for producing a long luminous emission, the key $z$ of this manipulator comes in contact with the rotary disk $u$. At a certain moment, the enlarged part $w^2$ placed in front of the perforation $w$ comes opposite the patten, so that the key $z$ sinks down and that the patten $z^1$ comes in contact with the contact $y$. As soon as the patten enters the opening $w^2$, the key $z$ engages into the narrow part of the perforation, the width of which is inferior to that of the patten, so that the latter remains in engagement with the contact and can be disengaged only at the time it arrives opposite the enlarged part $w^2$ situated at the end of the perforation. At this moment, the patten $z^1$ encounters the incline 1 and is automatically brought back above the plate $u$. In order to prevent the disk $u$ from rocking under the pressure exerted by the manipulators, this disk carries rollers 2 which roll on the plate $x$ (Fig. 12).

From the foregoing it will be understood that if the width of the perforation is suitably calculated, the current will be sent and the circuit closed only during the precise time of the lighting of the lamps. On the other hand, whatever may be the time at which the operator presses down the manipulator, the key of the latter will be able to come into contact with the corresponding contact only by entering in the front part of the perforation, and the manipulator will be able to be raised again only after all the lamps it controls will have been lighted. Thus any errors of oversight or carelessness on the part of the operator are avoided and, consequently, any errors in the transmission of the signals.

In the various methods of carrying out the invention which have been described the apparatus is continuously rotated. However, the apparatus may also receive a regular intermittent rotary motion, by means of a suitable device, for instance a regulating wheel, so that each bulb stops during a very short time opposite the single condenser. This method of actuation prevents the luminous trail due to the passage of the bulb from one edge of the condenser to the other.

The apparatus may also be arranged in such a manner that the disk $a$ receives an irregular intermittent movement for varying at will the duration of the lighting given by each bulb $e$ at its lighting point. Figs. 18 and 19 illustrate an apparatus provided with a device allowing to obtain this result. As shown in these figures, the motor $d$ and the pulley $c$ are done away with. This pulley is replaced by a ratchet 3 rigidly secured upon the axis $a^1$ of the bulb carrying disk $a$ and with which a spring pawl 4 is constantly in engagement. This pawl is hinged upon a metal rod 5 capable of sliding in a fixed sleeve 6. The latter is connected, by a plate 7 made of insulating material, to a support 8 suitably secured upon the support of the apparatus. The rod 5 constantly tends to be lifted under the action of a spring 9 taking a bearing, on the one hand, upon the upper part of the sleeve 6 and, on the other hand, upon an operating head 10. Upon the insulating plate 7 is secured a brush $i^2$ connected to one of the poles of the source of electric energy and replacing the brush $i$ in permanent contact with the mass.

A shoulder 11 on the rod 5 may encounter the brush $i^2$ when the head 10 is acted upon. The other pole of the source of electric energy is connected as in the first arrangement described to the brush $j$ with which can successively come into contact the bulb sockets mounted upon the insulating disk $a$.

The operation of the apparatus thus arranged is as follows: The apparatus being at rest, as illustrated in Fig. 18, the shoulder 11 is at a certain distance from the brush $i^2$, so that the electric circuit is not closed and none of the lamps are lighted. If a pressure is exerted upon the head 10, the rod 5 slides in the sleeve 6 moving along the pawl 4 which causes the ratchet 3 to advance to the extent of one tooth, thus bringing the socket of one of the bulbs $e$ in contact with the brush $j$. On the other hand, at this moment, the shoulder 11 comes in contact with the brush $i^2$, so that the electric circuit is closed and lamp $e$, the socket of which is in contact with the brush $j$, lights. So long as the pressure exerted upon the rod 5 is maintained, the bulb remains lighted. As soon as the head 10 is released, the rod 5 rises under the action of the spring 9, the brush $i^2$ ceases to be in contact with the shoulder 11 and the lamp is extinguished. By pressing again upon the rod 5, the ratchet 3 determines the rotation of the disk $a$ through a fraction of a revolution and a new bulb is brought opposite the brush $j$ and lights up.

Fig. 20 shows a modification of the intermittent movement apparatus which has just been described. In this modification the current instead of flowing through the brush $i^2$ goes through the branch $h$ and crown $g$, so that current is simultaneously supplied to one of the poles of every lamp. By actuating the rod 5, as in the previous arrangement, the disk $a$ rotates in an intermittent manner and the current is sent successively in the lamps $e$ which light up at a same point. It is to be understood that the rod 5 may be actuated by hand or mechanically.

An intermittent lighting could also be obtained with the continuous movement apparatus, by interrupting the current by means of a suitable device.

In case it is desired that each of the electric bulbs $e$ remains lighted during a relatively long time, the apparatus illustrated in Figs. 22 and 23 will be employed. This apparatus comprises a metallic disk 12 adapted to carry the bulbs $e$. These bulbs are each mounted upon a double hinge support 13 allowing the suitable setting of the bulb. The disk 12 is secured upon an axis engaged in a fixed metallic tube 14 upon which is rigidly mounted a ratchet 15 with the teeth of which a spring pawl 16 mounted upon the disk 12 can come in engagement. This disk 12 may be operated by means of a head 17.

Each bulb is on the one hand placed in body contact and on the other hand, connected through the medium of a wire 18, to a contact 19 mounted upon the disk 12. These contacts may come successively in contact with a brush 20 connected to one of the poles of the source of electric energy.

The bulbs $e$ therefore light up successively at one and the same point of the space, that is to say when the brush 20 comes in contact with the socket of these lamps and one of these bulbs remains lighted so long as the disk 12 is not rotated through a fraction of a revolution corresponding to one tooth of the ratchet 15, for bringing another bulb at the lighting point. The number of these bulbs is sufficient for giving to each of them time to cool between two successive lightings, as already set forth. Instead of mounting the bulbs $e$ upon a disk, they may be arranged upon the periphery of a rotary drum $e^{20}$ (Fig. 24) or upon an endless band $e^{30}$ (Fig. 25). The crown carrying the lamps could be mounted directly upon the axis of a small motor $e^{40}$ (Fig. 26) so that the space occupied by the whole of the lighting device may be very much reduced. In any case, the light produced will have a great intensity and, in practice, will be cold, which will allow of employing it for the uses indicated above. On the other hand, it is to be noted that by reason of the arrangement of the luminous source and of the optical system and by the supervoltage of this source, this intensive lighting may be obtained with a very small quantity of current, so that the sources of electric energy may be simply constituted by batteries or an accumulator of small size. These bulbs, having less than two and four centimeters of radius, presenting successively their 250 or 800 candle-power of cold light, with a source reduced to a point, at the focus of a very short focus condenser, without risk of breaking or blackening this condenser, even when the luminous source is put out of center in the bulb, to be brought nearer to the condenser, produce the same result as that which would be obtained with the most powerful arc lights of commerce, by reason of the utilization by the condenser of a luminous source of very small size and placed very close to said condenser.

Claims:

1. A lighting device comprising a rotary support, a plurality of electric lamps mounted upon said support and means for flashing electric current through said lamps as they pass in succession opposite a fixed point, the number of lamps being such that each lamp is given time to cool down between two successive lighting.

2. A lighting device comprising a rotary support, electric lamps mounted upon this support and means for causing said lamps to light up successively at one and the same point with supervoltage at this point, the number of these lamps being sufficient for giving to each filament time to cool between two successive lightings.

3. A lighting device comprising a disk of insulating material, an axis carrying said disk, an electric motor causing this axis to rotate continuously, a circular row of electric lamps mounted upon one of the faces of the disk, and means for automatically flashing electric current through said lamps as they pass in succession opposite a fixed point and cutting off the current as they leave this point, the speed of rotation of the lamps being such as to create the illusion of a fixed and permanent light at said fixed point.

4. A lighting device comprising a disk of insulating material, an axis carrying said disk, an electric motor causing this axis to rotate continuously, a circular row of electric lamps mounted upon one of the faces of the disk, a metallic armature supported by the other face of the disk and communicating with the lamps, a brush connected to one of the poles of the source of electric energy and rubbing upon the armature and another brush capable of being engaged successively by the lamp sockets.

5. A lighting device comprising a disk of insulating material, an axis carrying said disk, an electric motor causing this axis to rotate continuously, electric lamps placed at various points of the disk according to one and the same circle, a metallic armature supported by the other face of the disk and communicating with the lamps, a brush connected to one of the poles of the source of electric energy and rubbing upon the armature and another brush capable of being engaged successively by the lamp sockets.

6. A lighting device comprising a disk of insulating material, an axis carrying said disk, a motor for causing said axis to rotate continuously, two series of electric lamps mounted upon one and the same circle of the disk, two electric circuits for feeding the two series of lamps, two manipulators intercalated in these circuits and means for causing the lamps of one series to light up successively at one and the same point.

7. A lighting device comprising a disk of insulating material, an axis carrying said disk, a motor for causing said axis to rotate continuously, two series of electric lamps mounted upon one and the same circle of the disk, two electric circuits for feeding the two series of lamps, two contacts corresponding to the series of lamps placed upon the back face of the disk according to two different concentric circles, two brushes for rubbing upon these two contacts, two manipulators intercalated in these two circuits for closing the same, and a brush capable of being successively engaged by the sockets of the lamps.

8. A lighting device comprising a rotary support, an axis carrying said support, a motor causing said axis to rotate, electric lamps so arranged on said support as to pass in succession opposite a fixed point, means for automatically flashing electric current through said lamps as they pass opposite said fixed point, and means for reflecting the light generated by said lamps at said fixed point.

The foregoing specification of my lighting system, signed by me this 22nd day of March 1912.

CHARLES FRANÇOIS DUSSAUD.

Witnesses:
LUCIEN MENNINGER,
R. THIRIOT.